Nov. 6, 1951   D. H. LEWIS ET AL   2,573,853
SETTLING TANK FOR CRUDE OIL
Filed Dec. 5, 1949

Inventors: Donald H. Lewis
Adin H. Hall
John E. Green

By *[signature]* their Attorney

Patented Nov. 6, 1951

2,573,853

UNITED STATES PATENT OFFICE 2,573,853

SETTLING TANK FOR CRUDE OIL

Donald H. Lewis, Houston, Tex., Adin H. Hall, Cushing, Okla., and John E. Green, Houston, Tex., assignors to Shell Development Company, San Francisco, Calif., a corporation of Delaware Application December 5, 1949, Serial No. 131,154

7 Claims. (Cl. 210—61)

This invention relates to a settling tank for the removal of suspended solids or an immiscible liquid from liquids, and pertains more particularly to an improved settler for removing particles of solid material or water from petroleum pipe line streams.

It is often desirable to remove the solid particles or immiscible liquids that are carried by crude oil or petroleum products when it is pumped through a pipe line. For example, crude oil being pumped at the rate of 500 barrels per hour may carry about 0.1 pound of solid material per thousand barrels. This material tends to clog metering instruments and other pipe line equipment.

A common method of removing the solid material from crude oil comprises passing the crude oil through a strainer equipped with 16-mesh wire screen. Strainers of this type have a low efficiency as they are capable of removing only the particles of solid material that are 0.050 inch or larger, permitting a large percentage of the total solids to remain in the flow stream. Strainers are also limited in capacity and have to be cleaned frequently. As the screens of a strainer begin to clog, the crude oil flow therethrough is retarded with a resulting increase in pressure differential existing across the strainer. Also, when a strainer is being used, there is always a possibility of a screen or filter pad collapsing under a high-pressure drop.

The fundamental principle underlying the use of a settling tank for removing solids or suspended immiscible liquid from a suspending liquid, such as solid particles or water from crude, lies in taking advantage of the difference in gravity between the solid particles (or water) and the gravity of the liquid. A moving body of liquid will carry along with it a fairly constant amount of suspended solids depending principally upon the velocity of flow, the density and the particle size of the solid. For a given liquid at a substantially constant temperature and a given finely divided solid, the important variable factor is the velocity of flow. Assuming that there is an appreciable difference in density between the solids and the liquid, the suspended solids or liquid may be largely removed from a rapidly flowing body of liquid by creating a zone in which the rate of flow and the turbulence are very small.

It is, therefore, an object of this invention to provide an improved settling tank for the removal of solid particles and/or water from crude oil and petroleum flow streams.

It is also an object of the present invention to provide a settling tank having a large throughput capacity and requiring less frequent cleaning.

Another object of this invention is to provide a settling tank for a crude oil pipe line whose operation results in only a small pressure drop in the line, there being, furthermore, no pressure built up if the cleaning of the tank is delayed.

Still another object of this invention is to provide a sturdy settling tank that is not injured or made inoperative by a high pressure surge.

Other objects and advantages of the invention will become apparent from the following detailed description taken with reference to the drawing, wherein.

Figure 1:
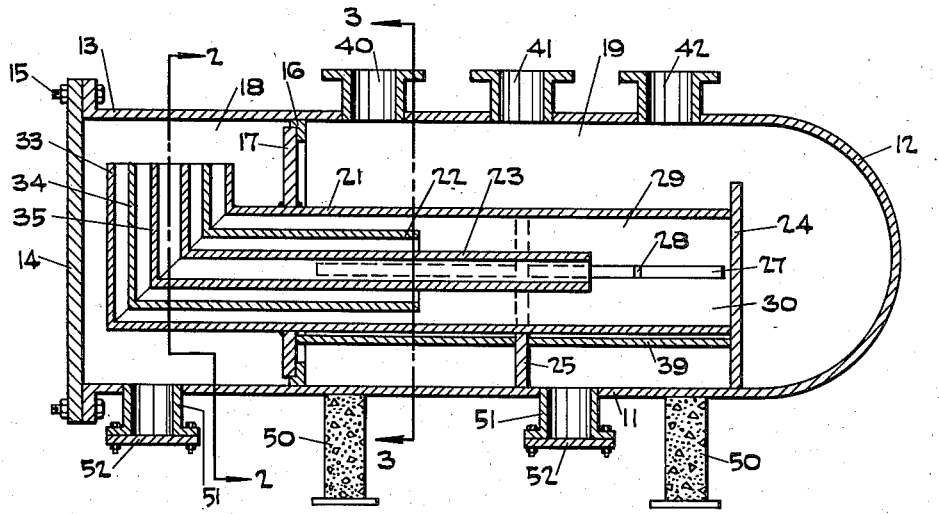
Figure 1 is a longitudinal view in cross section of the present settling tank illustrating the nested or concentric arrangement of the distributor pipes or conduits.

Referring to Figure 1 of the drawing, the present settling tank may be of any suitable shape and is shown as a horizontal, substantially cylindrical vessel 11 having a closed convex end 12 and an open end 13 which is normally closed by a high pressure head or plate 14 secured to the vessel in a fluid-tight manner by any suitable means, as by bolts 15.

Fixedly secured, as by welding, to the inside wall of the vessel 11 near the open end 13 thereof is an internal flange 16 adapted to seat a plate 17 thereagainst in a substantially fluid-tight manner, said plate 17 forming transverse wall means dividing the vessel 11 into two chambers 18 and 19. The chambers may be of any size but preferably chamber 19 is at least four times as long as chamber 18.

Figure 2:
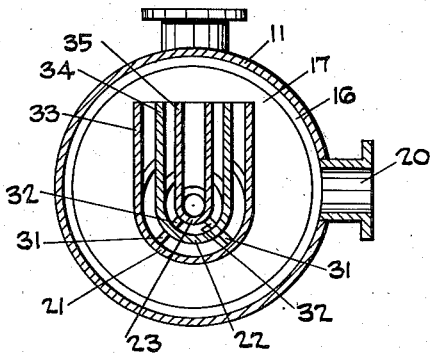
Figure 2 is a view in vertical cross section taken along the lines 2—2 of Figure 1.

As shown in Figure 2, the vessel 11 is provided with an inlet port 20 leading through the wall thereof into chamber 18. Chambers 18 and 19 are in communication through a plurality of concentric or nested inlet pipes or conduits 21, 22 and 23 extending horizontally through plate 17. The pipes, for example, may be standard 6, 8 and 10-inch pipe. The outer pipe 21 extends substantially the entire length of chamber 19 and is closed at its extended end by a plate 24. The pipe 21 is supported above the bottom of the vessel 11 by plates 17 and 24, and, if desired, by one or more additional plates 25 or other support means.

Fluid flowing into pipe 21 is discharged in a horizontal direction through suitable port means, preferably formed as a pair of horizontal slots 26 and 27 (Figures 1 and 3) positioned diametrically opposite each other in the sides of the pipe and extending substantially from plate 17 to plate 24. If desired, reenforcing elements 28 may be fixedly secured in the slots.

Figure 3:
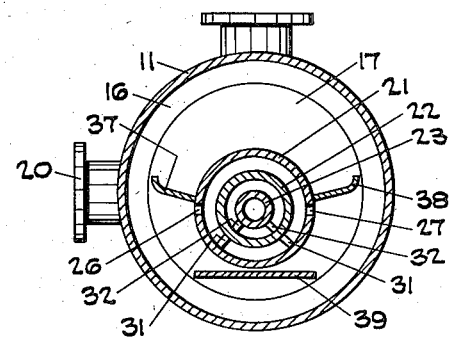
Figure 3 is a view in vertical cross section taken along the line 3—3 of Figure 1.

The two inner pipes 22 and 23 are maintained in fixed spaced relationship by support and spacing elements 31 and 32 (Figures 2 and 3). The innermost pipe 23 extends approximately two-thirds the distance to the closed end of the slotted pipe 21, while the intermediate pipe 22 extends approximately one-third of that distance. By staggering the length of the inlet pipes 22 and 23 in this manner, a substantially uniform distribution of the inlet flow along the slotted pipe 21 is obtained. While the present invention is described as having three concentric inlet pipes or distributor conduits 21, 22 and 23, it is obvious that any desired number of pipes, such as from two to six, may be arranged concentrically with the extended ends of said pipes extending varying distances into the slotted outer pipe.

Affixed in any suitable manner, as by welding, to the ends of inlet pipes 21, 22 and 23 that extend into chamber 18, are three vertical inlet standpipes 33, 34 and 35, respectively equal in diameter to pipes 21, 22 and 23, and preferably extending to a level above that of the inlet port 20 (Figure 2). Thus, the standpipes 33, 34 and 35 serve as baffle means for removing the larger solid particles of material from the fluid flow stream, causing said particles to settle to the bottom of chamber 18.

The outer conduit 21 is provided with a pair of substantially horizontal flow-directing vanes 37 and 38 which are suitably secured, as by welding to the outer surface of said conduit 21 just above the discharge slots 26 and 27 therein. If desired, the vanes 37 and 38 may tilt upwards slightly and be curved slightly at the outer ends (as shown in Figure 3) so as to permit a smooth flow of liquid as it rises past the ends of the vanes. The function of vanes 37 and 38 is to lengthen the travel of the fluid within the chamber 19, thus giving suspended materials more time to settle out. Preferably, a baffle (Figures 1 and 3) 39 is mounted and secured between plates 17 and 25 and above the bottom of the chamber, said baffle serving to prevent any settled solid particles in the bottom of the tank from being agitated and re-suspended by the influent stream. Sufficient room is provided on either side of said baffle 39 to permit sediment to settle below it.

Outlet ports 40, 41 and 42 are provided in the top of the vessel 11 for the removal of the substantially solid-free liquid from chamber 19. Obviously, a greater or lesser number of outlet ports may be provided. The total cross sectional area of the outlet ports 40, 41 and 42 is at least as great and preferably greater than that of the inlet port 20. A plurality of outlet ports spaced uniformly along the top of said vessel 11 is preferred to permit the fluid within the chamber 19 to be discharged from all portions thereof at a substantially uniform rate. The several outlet ports 40, 41 and 42 may be connected to a common header pipe which, in turn, may be connected to a pipe line (not shown). The vessel 11 may also be provided with one or more drain parts 51 which are normally closed in any suitable manner as by blank flanges 52, valves, or the like.

It is to be noted that the present settling tank comprises three units: (1) the vessel or tank 11 with its internal flange 16, (2) the removable end plate or pressure head 14, and (3) the distributor and baffle unit comprising the concentric conduits 21, 22 and 23 with the attached standpipes 33, 34 and 35 together with plates 17, 24 and 25, vanes 26 and 27 and baffle 39. Thus, it may be seen that the distributor and baffle unit may be readily removed as such from the vessel 11 after removing the pressure head 14, which facilitates periodic cleaning of the settling tank. To facilitate the removal of the pressure head 14 and the distributor unit for cleaning sediment from the settling tank, the tank 11 may be mounted in an elevated horizontal position on suitable support means, as for example, on cement saddles 50 (Figure 1).

The diameter of the outer distributor conduit 21 is less than one-half, and preferably about one-fourth that of the vessel 11. The concentric distributor conduits 21, 22 and 23 may be positioned coaxially within the vessel 11 but are preferably positioned as shown with the major portion of said conduits being below the center line of the vessel 11 and the flow-directing vanes 37 and 38 located so that the outer tips thereof are substantially at the greatest horizontal width of the vessel.

Figure 4:
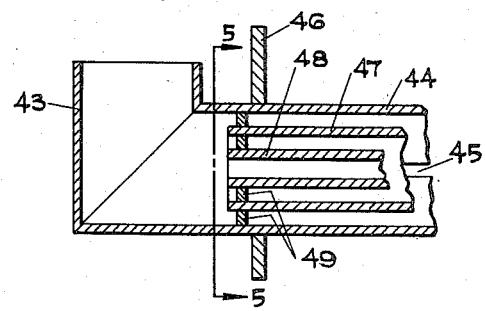
Figure 4 is a view in longitudinal cross section of another embodiment of a distributor and baffle unit of the present settling tank.
Figure 5:
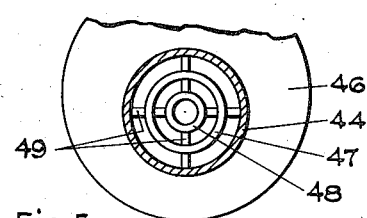
Figure 5 is a view in vertical cross section taken along the line 5—5 of Figure 4.

While the intake of the distributor unit preferably comprises a plurality of concentric standpipes 33, 34 and 35, as shown in Figures 1 and 2, another embodiment of the distributor and baffle unit may comprise a single standpipe 43 welded to a conduit 44 as shown in Figures 4 and 5. The conduit 44 is equipped with a longitudinal slot 45 and communicates with either side of a transverse plate 46 as described with the previous embodiment. Fixedly positioned within said conduit 44 in spaced coaxial relationship therewith are two inner conduits 47 and 48 of successively smaller diameters that are similar in size, shape and purpose to conduits 22 and 23, previously described. The conduits 44, 47 and 48 may be fixedly spaced from each other by suitable spacing elements or spiders 49.

When the present settling tank is connected into a crude oil pipe line, the upstream end of said pipe line is connected to the flanged inlet port 20 of the tank 11 and the downstream end of said pipe line is connected to the outlet ports 40, 41 and 42. In operation, fluid is fed into chamber 18 (Figure 1) of the settling tank through the inlet port 20 (Figure 2). Due to the vertical position and height of the intake standpipes 33, 34 and 35, the fluid flow is forced to rise to the top of the chamber 18 before entering the open end of the standpipes of the distributor units. The baffling action of these standpipes causes any large particles of solid matter to settle out of the liquid and accumulate at the bottom of the chamber 18.

The unique nested construction of the distributor pipes 21, 22 and 23 assures substantially uniform flow along conduit 21 and discharge therefrom. Fluid entering the annular space between standpipes 33 and 34 and flowing between conduits 21 and 22 is discharged through the portions of the slots 26 and 27 in conduit 21 that are substantially adjacent conduit 22. Likewise, fluid entering the annular space between conduits 34 and 35 is discharged through the portions of the slots 26 and 27 that are adjacent conduit 23. Fluid passing through standpipe 35 and conduit 23 is discharged through the portions of slots 26 and 27 that extend beyond the end of conduit 35.

Since the discharge slots 26 and 27 are cut horizontally along opposite sides of conduit 21, fluid is discharged from said conduit 21 in two thin layers, the flow being in a horizontal direction which does not tend to promote turbulence. At the same time, the flow is further directed by the substantially horizontal vanes 37 and 38, towards the zone of maximum diameter and area where the velocity of flow within the tank is at a minimum. A flow directed vertically upward from conduit 21 would tend to oppose the settling of the solid material; a flow directed vertically downward would tend to agitate and re-suspend any solid material which had accumulated on the bottom of the tank.

It is apparent that for a settling tank to operate, the velocity of the flowing fluid layer and the thickness of the layer must be such that the suspended particles may fall through the layer in the time between the formation of the layer and the discharge of the fluid from the top of the vessel. The thickness of the layer of fluid may be governed to some extent by the size of the discharge slots 26 and 27, which in a 10-inch pipe, for example, are about 2 inches in height.

To illustrate the above, the following calculations are included. As the layers of fluid flow from the discharge slots 26 and 27, they move almost horizontally along the bottom surfaces of the directing vanes 37 and 38, turning into the vertical passages between the ends of the vanes and the walls of the vessel 11. The only suspended particles that get into the upper portion of the tank are those whose settling velocities are slower than the velocity of the fluid at the tips of the vanes 37 and 38.

Using the flow formula $Q = AV$, where $Q$ equals flow in cubic feet per second, $A$ equals area in square feet and $V$ equals velocity in feet per second, the velocity at the vane tips for a flow of 100 barrels per hour through a settler having a suitable flow cross-section area may have a value such as .0134 foot per second.

Where the flowing velocity of fluid is small and streamlined or viscous flow exists, Stokes' law (for the movement of particles suspended in a viscous medium) is applicable.

$$V = 73.9 D^2 \frac{(S - S^1)}{Z}$$

where $V$ equals velocity of settling in feet per second, $D$ equals diameter of particle in inches, $S$ equals density of particle in pounds per cubic foot, $S^1$ equals density of fluid in pounds per cubic foot and $Z$ equals viscosity of the fluid in centipoises.

For mixed Texas crude oil of a viscosity of 6 centipoises and an API gravity of 36.4° at 60° F., the diameter of the smallest spherical quartz particle (sp. gr. equals 2.65) which would maintain equilibrium at a flow rate of 100 barrels per hour, is accordingly $$0.0134 = 73.9 D^2 \frac{(165.0 - 52.6)}{6}$$

$D = 0.00311$ or $1/321$ inch

For the same crude oil and using similar calculations, the velocities and particle sizes for other flow rates are as follows:

For 250 barrels per hour:
  $V = 0.0467$ foot per second
  $D = 0.00577$ or $1/173$ inch For 500 barrels per hour:
  $V = 0.0667$ foot per second
  $D = 0.00695$ or $1/144$ inch For 1,000 barrels per hour:
  $V = 0.134$ foot per second
  $D = 0.00983$ or $1/102$ inch The efficiency of the present settler at various flow rates while operating in a crude oil stream whose solid material content is 0.1165 pound per thousand barrels is as follows:

| Flow Rate Barrels Per Hour | Efficiency Per Cent |
|---|---|
| 100 | 81 |
| 250 | 70 |
| 500 | 54 |
| 750 | 39 |

It may be seen that a settler according to the present invention can be designed for any efficiency at any flow rate from these data and the design data previously given.

The invention claimed is:

1. A settling tank comprising a horizontally disposed cylindrical vessel having at least one open end, removable head means normally closing said end in fluid-tight manner, an annular flange member spaced from said head means affixed to the inner walls of said vessel in a plane perpendicular to the axis thereof, a fluid distributor unit insertable into said vessel through the open end thereof, said unit comprising a circular plate member adapted to register with said annular flange to divide said vessel into a first and a second fluid-tight chamber, fluid distributor conduit means extending from said first into said second chamber through said plate member and affixed to said plate member, said conduit means comprising an outer tubular means having a generally vertical axis in the first chamber and a horizontal axis in the second chamber, horizontal slot means in said tubular means in the second chamber, inner tubular means extending concentrically within said outer tubular means at least through a portion of their length in the second chamber, fluid inlet means through the walls of said vessel to said first chamber, and fluid outlet means through the walls of said vessel from said second chamber.

2. A settling tank comprising a horizontally disposed cylindrical vessel having at least one open end, removable head means normally closing said end in fluid-tight manner, an annular flange member spaced from said head means affixed to the inner walls of said vessel in a plane perpendicular to the axis thereof, a fluid distributor unit insertable into said vessel through the open end thereof, said unit comprising a circular plate member adapted to register with said annular flange to divide said vessel into a first and a second fluid-tight chamber, fluid distributor conduit means extending from said first into said second chamber through said plate member and affixed to said plate member, said conduit means comprising an outer tubular means having a generally vertical axis in the first chamber and a horizontal axis in the second chamber, horizontal slot means in said tubular member in the second chamber, flow-directing vanes affixed to said outer tubular means above said horizontal slot means, at least one inner tubular means member extending concentrically within said outer tubular member at least throughout a portion thereof in the second chamber, fluid inlet means through the side walls of said vessel to said first chamber through which fluid enters said chamber in a substantially horizontal direction, and fluid outlet means through the walls of said vessel from said second chamber.

3. A settling tank comprising a horizontally disposed cylindrical vessel having at least one open end, removable head means normally closing said end in fluid-tight manner, an annular flange member spaced from said head means affixed to the inner walls of said vessel in a plane perpendicular to the axis thereof, a fluid distributor unit insertable into said vessel through the open end thereof, said unit comprising a circular plate member adapted to register with said annular flange to divide said vessel into a first and a second fluid-tight chamber, fluid distributor conduit means extending from said first into said second chamber through said plate member and affixed to said plate member, said conduit means comprising an outer tubular member having a generally vertical axis in the first chamber and a horizontal axis in the second chamber, horizontal slots in the side walls of said tubular member in the second chamber, said outer tubular member being closed at the end within the second chamber, substantially horizontal flow-directing vanes affixed to said outer tubular member above said horizontal slots, two inner tubular members extending concentrically within said outer tubular member, said innermost and intermediate tubular members being open-ended and extending within said portion of the outer tubular member in said second chamber substantially two-thirds and one-third the length thereof, respectively, fluid inlet means through the side walls of said vessel for directing a flow of fluid in substantially a horizontal direction into said first chamber, and fluid outlet means through the walls of said vessel from said second chamber.

4. A settling tank comprising a horizontally disposed cylindrical vessel having at least one open end, removable head means normally closing said end in fluid-tight manner, an annular flange member spaced from said head means affixed to the inner walls of said vessel in a plane perpendiculuar to the axis thereof, a fluid distributor unit insertable into said vessel through the open end thereof, said unit comprising a circular plate member adapted to register with said annular flange to divide said vessel into a first and second fluid-tight chamber, fluid distributor conduit means extending from said first into said second chamber through said plate member and affixed to said plate member, said conduit means comprising an outer tubular member having a generally vertical axis in the first chamber and a horizontal axis in the second chamber, said horizontal portion of said outer tubular member being spaced from the bottom thereof and having a closed end, horizontal slot means in the side walls of said tubular member in the second chamber, substantially horizontal flow-directing vanes affixed to said outer tubular member above said horizontal slot means, flow baffling means positioned below said distributor conduit means for minimizing agitation within the bottom of the vessel, a plurality of inner tubular members of progressively smaller diameters extending concentrically within said outer tubular member, and terminating at spaced points within the horizontal portion of the outer tubular member in the second chamber, fluid inlet means through the walls of said vessel for directing the flow of fluid in substantially a horizontal direction into said first chamber, and fluid outlet means through the walls of said vessel from said second chamber.

5. A settling tank comprising a horizontally disposed substantially cylindrical vessel, transverse vertical plate means dividing said vessel into first and second fluid-tight chambers, inlet port means through the wall of said vessel into said first chamber, outlet port means through the wall of said vessel from the second chamber, horizontal fluid distributor conduit means extending from the first chamber and through the transverse plate means into said second chamber, said first and second chambers being in communication through said distributor means, said distributor conduit means comprising a plurality of concentric pipes of progressively smaller diameters, the outer pipe having a closed end and having outlet port means through the side walls substantially the length thereof, the concentric pipes of smaller diameter within said outer conduit means being open-ended and shorter in length than said outer conduit means to give an even distribution of fluid from said fluid outlet port means into said second chamber, and baffle means comprising standpipe means secured to said horizontal distributor conduit means within the first chamber.

6. A settling tank comprising a horizontally disposed substantially cylindrical vessel, transverse vertical plate means dividing said vessel into first and second fluid-tight chambers, inlet port means through the wall of said vessel into said first chamber, outlet port means through the wall of said vessel from the second chamber, horizontal fluid distributor conduit means extending from the first chamber and through the transverse plate means into said second chamber, said first and second chambers being in communication through said distributor means, said distributor conduit means comprising a plurality of concentric pipes of progressively smaller diameters, the outer pipe having a closed end and having slotted outlet ports through the side walls within the second chamber substantially the length thereof, the concentric pipes of smaller diameter within said outer conduit means being open-ended and shorter in length than said outer conduit means to give an even distribution of fluid from said fluid outlet ports into said second chamber, and baffle means comprising concentric standpipe means secured to said horizontal distributor conduit means within the first chamber with the axis of the standpipe means substantially perpendicular to the axis of the inlet port means to said first chamber.

7. A settling tank comprising a horizontally disposed substantially cylindrical vessel, said vessel having one end normally closed by removable plate means, transverse vertical plate means dividing said vessel into first and second fluid-tight chambers, said second chamber having a greater axial length than said first chamber, inlet port means through the side wall of said vessel for directing a flow of fluid in a substantially horizontal plane into said first chamber, a plurality of outlet ports through the top of said vessel from the second chamber, horizontal fluid distributor conduit means extending from the first chamber and through the transverse plate means into said second chamber, said first and second chambers being in communication through said distributor means, support means for positioning said distributor conduit means substantially intermediate the bottom of said vessel and a horizontal plane passing through the axis thereof, said distributor conduit means comprising a plurality of concentric pipes of progressively smaller diameters, the outer pipe having a closed end in said second chamber and having slots through the side walls substantially the length thereof, substantially horizontal fluid directing vanes affixed to said outer pipe above said slots, horizontal plate means secured between said support means below said slotted outer pipe for minimizing the agitation in the bottom of the vessel, the conduit means of smaller diameter within said outer conduit means being open-ended and shorter in length than said outer conduit means to give an even distribution of fluid from said fluid outlet ports into said second chamber, and baffle means comprising concentric standpipe means respectively secured to the pipes of said distributor conduit means within the first chamber, the open end of said standpipe means extending to a level above that of said inlet port means of said vessel.

DONALD H. LEWIS.
ADIN H. HALL.
JOHN E. GREEN.

REFERENCES CITED

The following references are of record in the file of this patent:

UNITED STATES PATENTS

| Number | Name | Date |
|---|---|---|
| 974,717 | Sphaler et al. | Nov. 1, 1910 |
| 995,521 | Buhr | June 20, 1911 |
| 1,116,903 | McClintock | Nov. 10, 1914 |
| 2,355,305 | Roenig | Aug. 8, 1944 |

FOREIGN PATENTS

| Number | Country | Date |
|---|---|---|
| 748,346 | France | Apr. 10, 1933 |